Dec. 4, 1962 P. L. ADAMS ET AL 3,066,722
BOARD MAKING APPARATUS
Filed Nov. 8, 1960 9 Sheets-Sheet 2
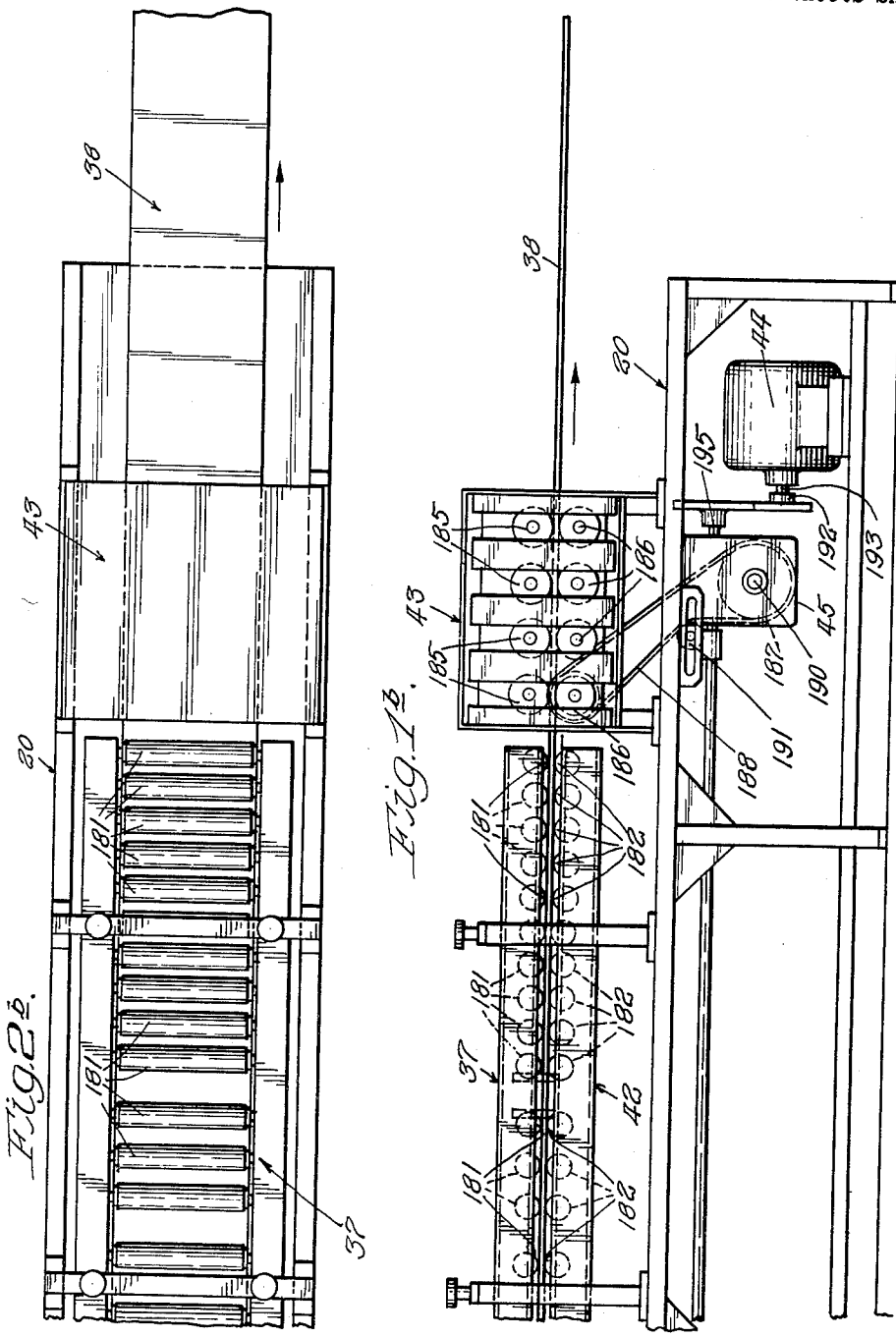

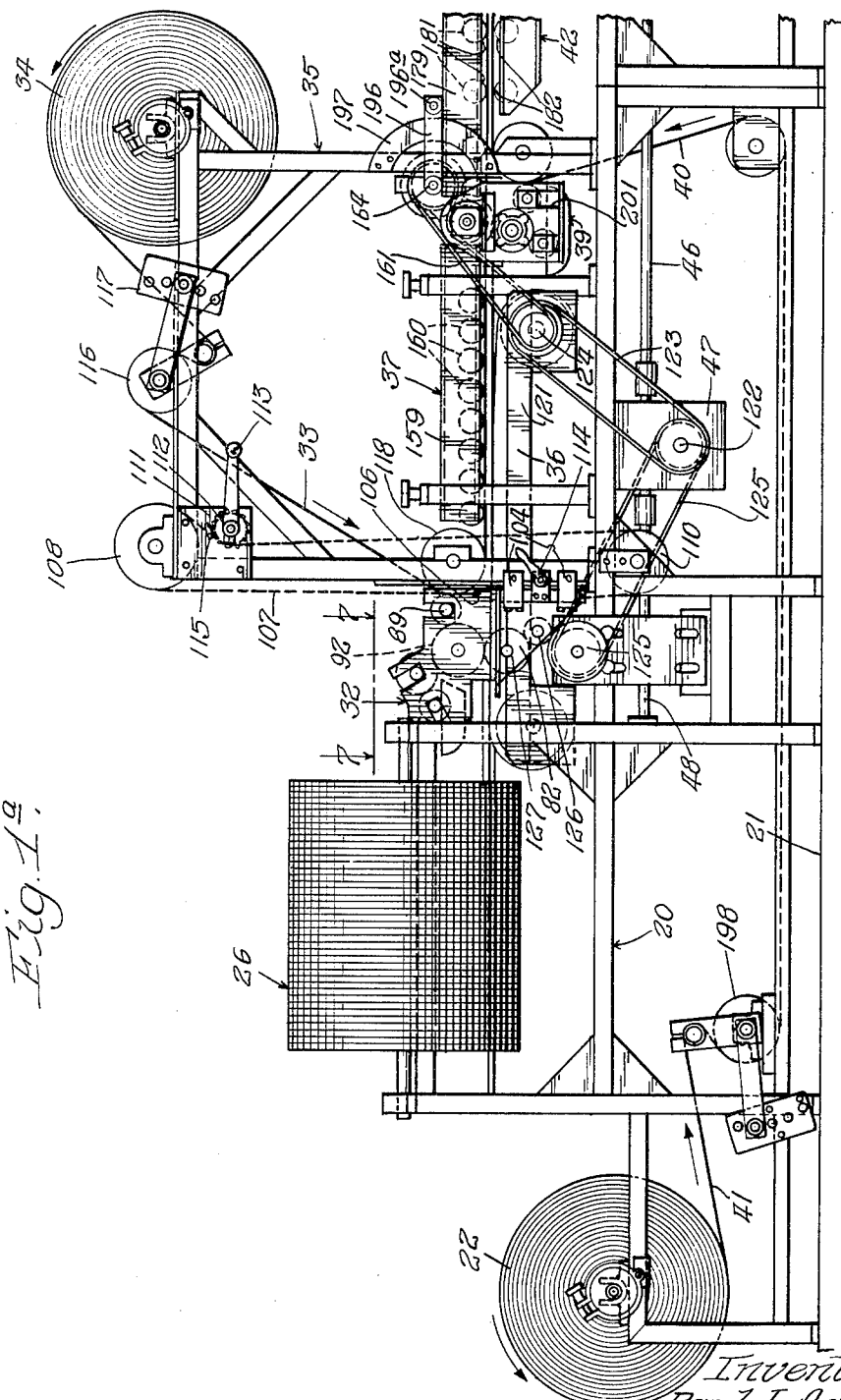

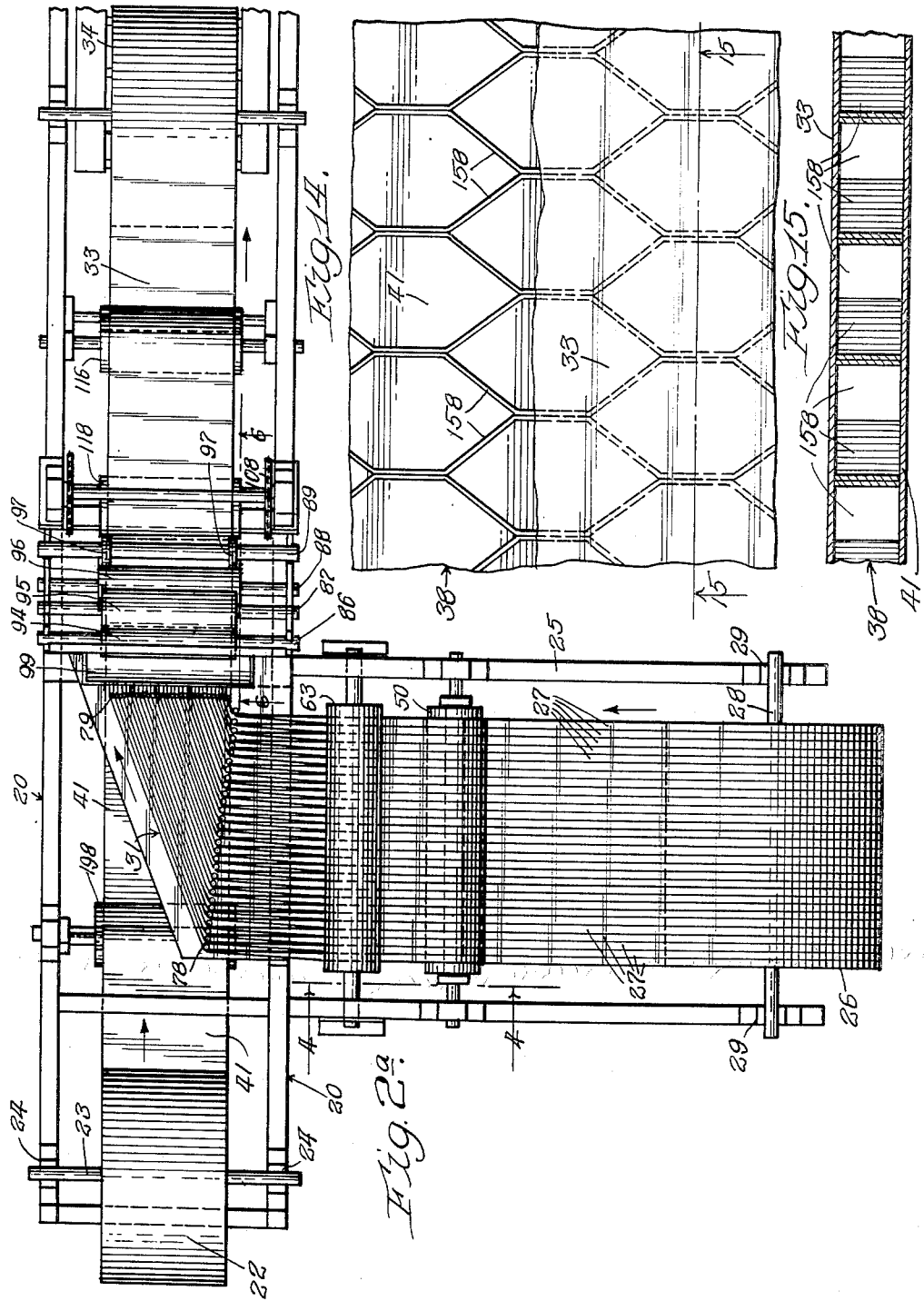

Dec. 4, 1962 P. L. ADAMS ET AL 3,066,722
BOARD MAKING APPARATUS
Filed Nov. 8, 1960 9 Sheets-Sheet 4
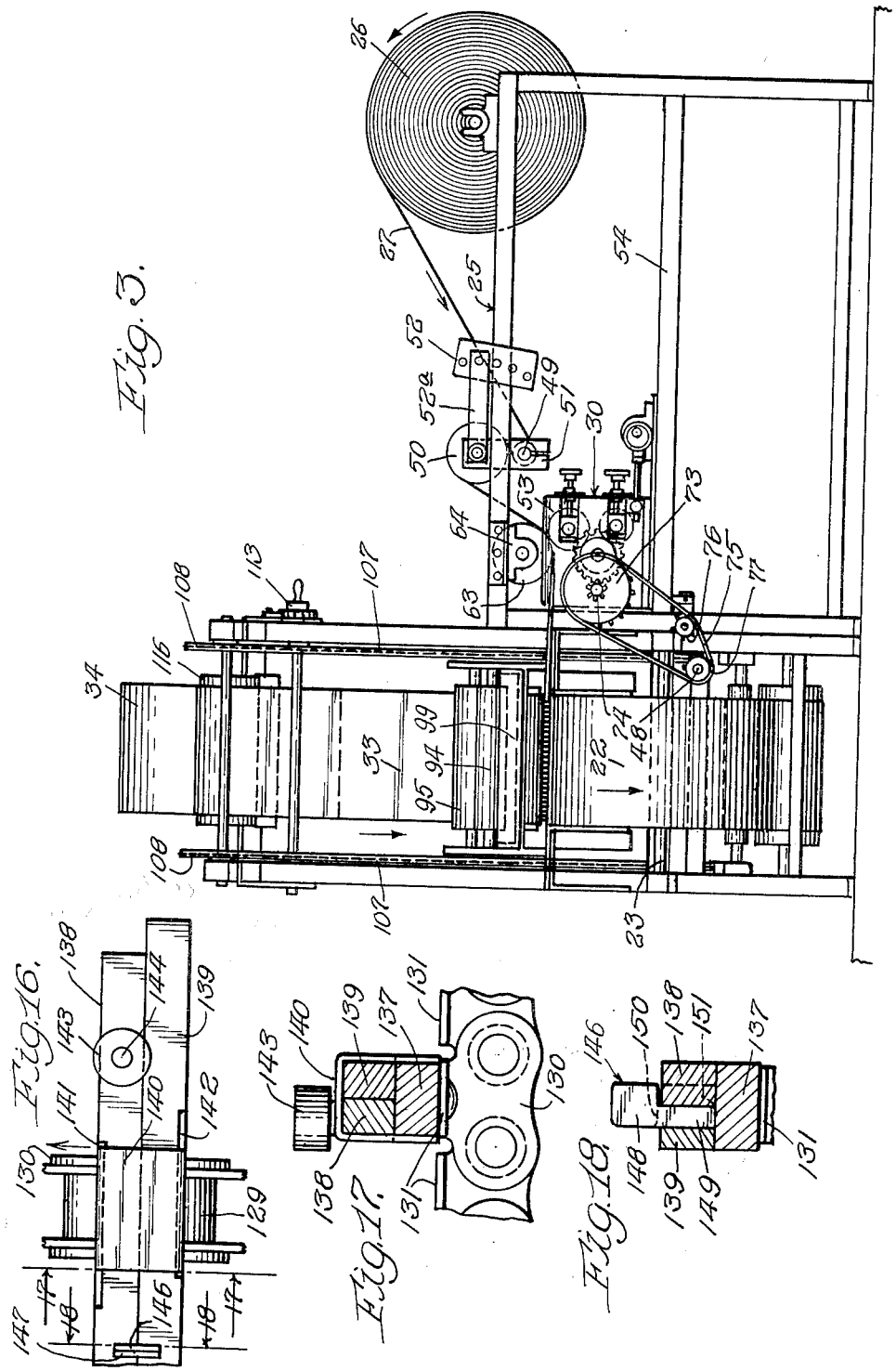

Dec. 4, 1962 P. L. ADAMS ETAL 3,066,722
BOARD MAKING APPARATUS
Filed Nov. 8, 1960 9 Sheets-Sheet 5

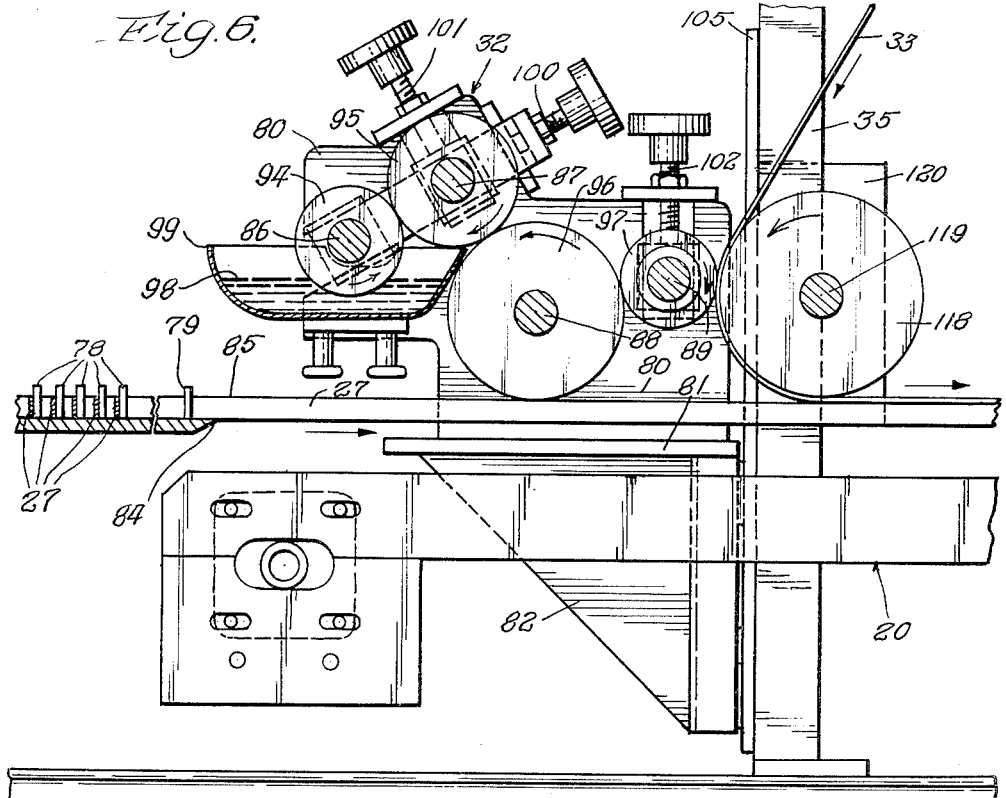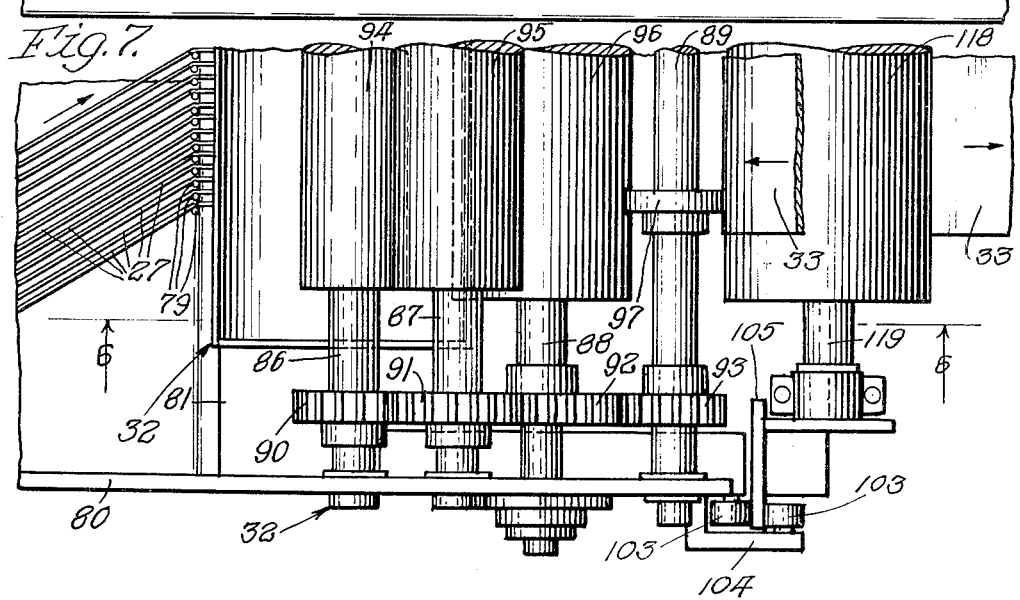

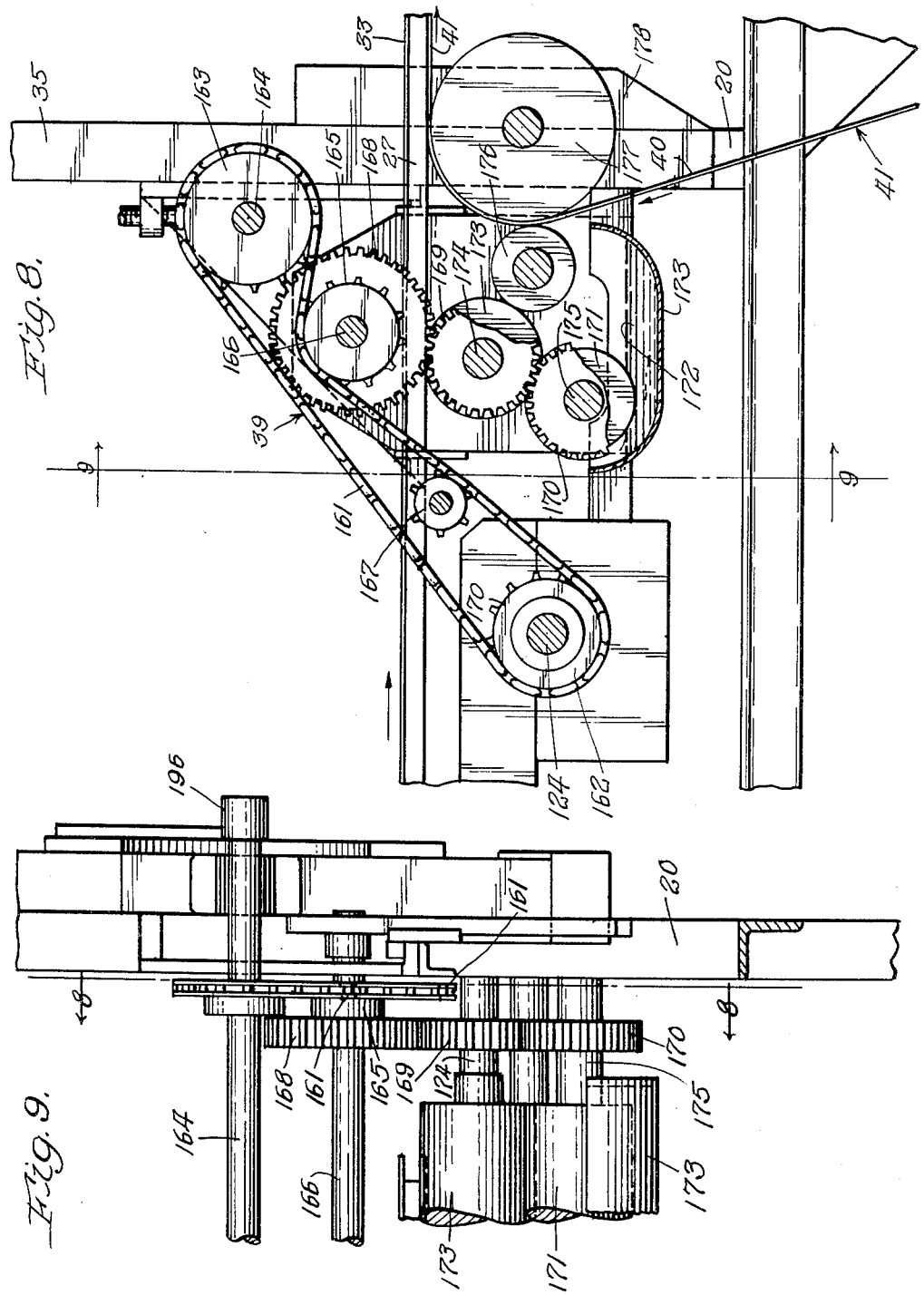

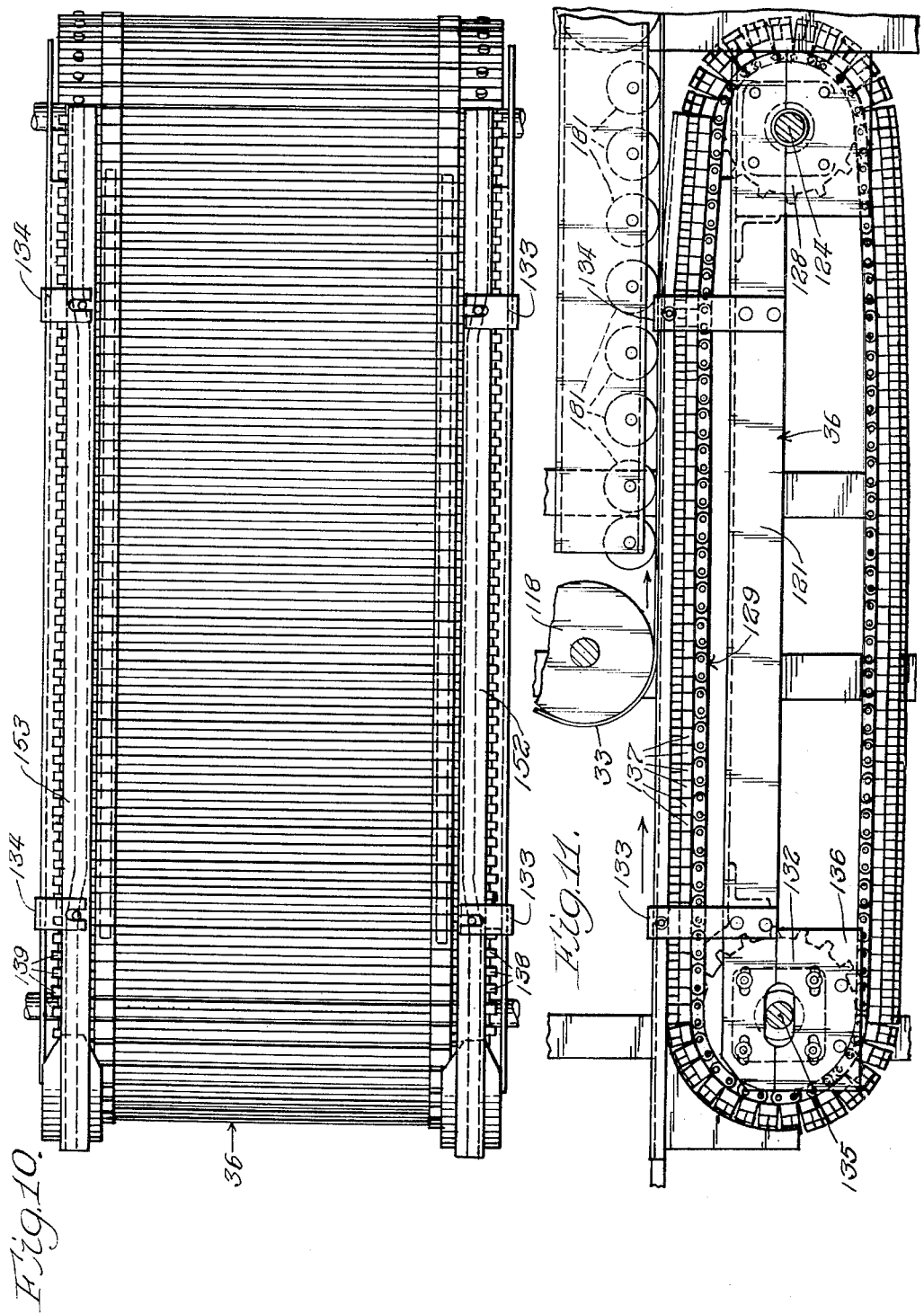

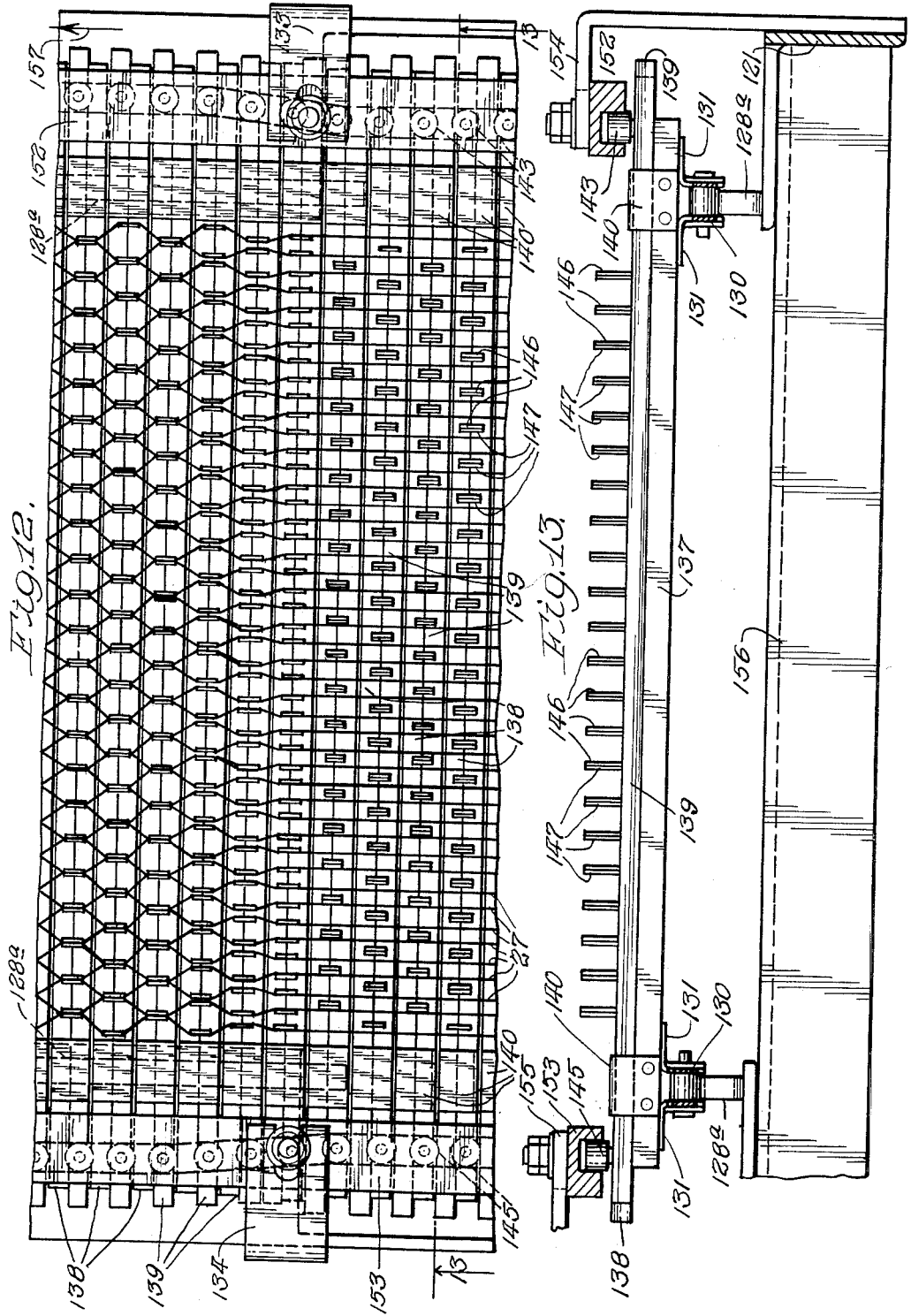

United States Patent Office 3,066,722
Patented Dec. 4, 1962

3,066,722
BOARD MAKING APPARATUS
Paul L. Adams, Dubuque, Iowa, and Henry E. Zimmerman and Harold G. Bailey, Akron, Ohio, assignors, by mesne assignments, to Caradco Incorporated, a corporation of Iowa
Filed Nov. 8, 1960, Ser. No. 67,954
19 Claims. (Cl. 156—470)

This invention relates to a board making apparatus particularly for making boards continuously with the boards having an expanded honeycomb type core made of flexible strips of material and relates also to a core forming device forming a part of a continuous board making apparatus.

The board produced by the apparatus of this invention comprises a core made of strips of flexible material such as paper, plastic, metal and the like arranged in a honeycomb like formation with this core having attached top and bottom sheets of flexible material so that the resulting board gives the appearance of a solid board and is extremely strong in resisting bending. The apparatus of this invention produces a board of this type continuously from sheet material applied to the apparatus in an improved manner.

One of the features of this invention therefore is to provide an improved board making apparatus for producing a board of the above-described type. Another feature of the invention is to provide an improved device for forming a core of the above-described honeycomb type with this core device being particularly useful as a part of such a continuous board making apparatus.

Other features and advantages of the invention will be apparent from the following description of one embodiment thereof as shown in the accompanying drawings. Of the drawings:

FIGURES 1a and 1b taken together show a side elevation of a continuous board making machine embodying the invention.

FIGURES 2a and 2b taken together show a plan view of this embodiment.

FIGURE 3 is an end elevational view of the machine taken from the left-hand end of FIGURE 1a.

FIGURE 4 is a fragmentary, sectional elevational view taken substantially along line 4—4 of FIGURE 2a.

FIGURE 6 is a sectional elevational view taken substantially along line 6—6 of FIGURES 2a and 7.

FIGURE 7 is a fragmentary plan view taken substantially along line 7—7 of FIGURE 1a.

FIGURE 8 is a sectional view partially broken away for clarity of illustration of the adhesive applying mechanism at the right-hand side of FIGURE 1a with the section being taken substantially along line 8—8 of FIGURE 9.

FIGURE 9 is a sectional, elevational view taken substantially along line 9—9 of FIGURE 8.

FIGURE 10 is a plan view illustrating the core forming portion only of the apparatus with adjacent elements of the apparatus omitted for clarity of illustration.

FIGURE 11 is a side elevational view of the portion of the apparatus illustrated in FIGURE 10.

FIGURE 12 is an enlarged, detailed plan view of a portion of the apparatus of FIGURE 10 extending at right angles to the FIGURE 10 view with a portion only of the paper strips used in making the honeycomb core shown in plan view.

FIGURE 13 is a sectional, elevational view taken substantially along line 13—13 of FIGURE 12.

FIGURE 14 is an enlarged plan view of a section of board produced by the apparatus of this invention and partially broken away for clarity of illustration.

FIGURE 15 is a sectional, elevational view taken substantially along line 15—15 of FIGURE 14.

FIGURE 16 is a fragmentary plan view of a portion of the right-hand end of FIGURE 12 showing a chain link of the conveyor chain of the core making device and a pair of cooperating mounting members of the core making device.

FIGURE 17 is a fragmentary, sectional view taken substantially along line 17—17 of FIGURE 16.

FIGURE 18 is a sectional, elevational view taken substantially along line 18—18 of FIGURE 16.

Figure 4:
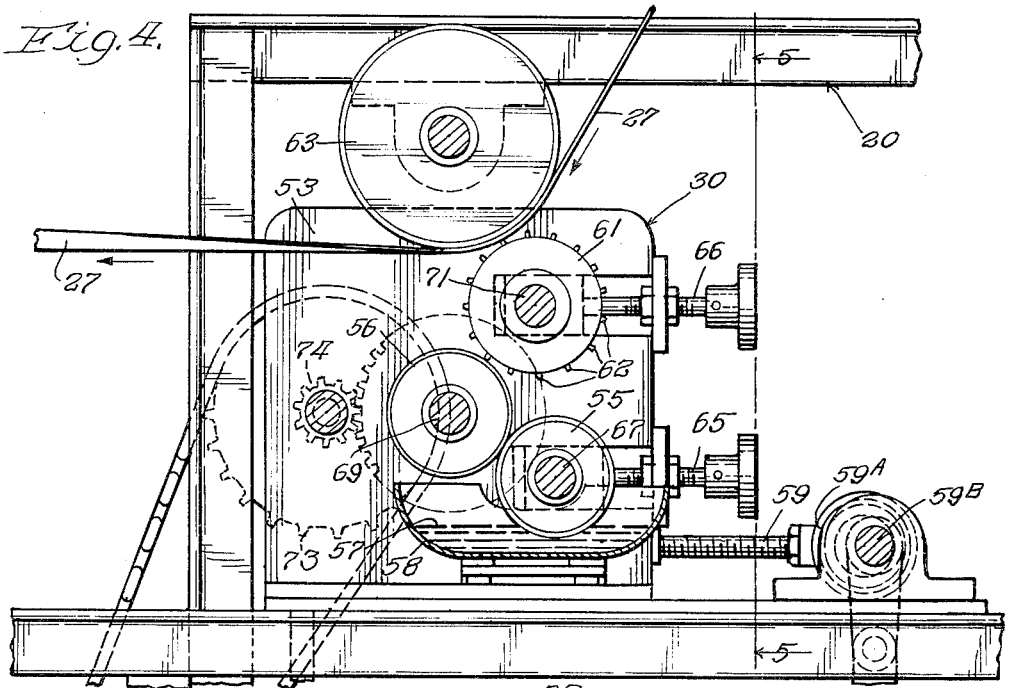

In certain of the above figures, elements that appear in some figures are omitted in others for clarity of illustration. The directions of movement of the materials through the apparatus shown in the various figures are indicated by arrows in these figures.

In the apparatus shown in the accompanying drawings there is provided a framework 20 made up of steel angles and supported on a base 21 such as a floor. At one end of the apparatus, here shown as the rear end, there is provided a roll 22 of kraft paper supported on a bar 23 held in cradles 24 at one end of the framework.

Forwardly of the roll 22 of paper an auxiliary framework 25 is provided, extending at right angles to the principal framework 20. Located on this auxiliary framework 25 is a roll 26 of paper that has been slit into strips 27. The roll 26 is also supported on a bar 28 rotatably held in cradles 29.

Positioned forwardly of the roll 26 and on the auxiliary framework 25 there is positioned a first adhesive applying station at which is located a device 30 for applying adhesive to the strips 27 of paper.

Forwardly of the device 30 there is located a turning station 31 where the strips 27 of paper are turned substantially 90° and arranged vertically and side-by-side horizontally to present top and bottom edges. As shown in FIGURE 2a, the turning station 31 is located primarily on the principal framework 20.

Beyond the turning station 31 there is located a second adhesive applying device 32 for applying adhesive to the top edges of the core. A sheet 33 of paper is drawn from a roll 34 mounted at the top front portion of a superstructure 35 extending above the main body of the apparatus.

Beneath the second adhesive applying device 32 is a device 36 (FIGURES 10-13) for forming the core of the board so that the core is formed before the adhesive from device 32 is applied. The unit 32 is at about one-fourth the distance from the start of the core former with the balance of the distance being used to permit the adhesive to set. The sheet of paper 33 is pressed into position by the roller 118. Extending from about midway of the core forming device 36 to adjacent the front end of the apparatus is a presser mechanism 37 for applying pressure to the thusly applied top sheet 33.

Forwardly of the core forming device 36 there is provided a third adhesive applying device 39 for applying adhesive to the bottom edges of the core. The inner surface 40 of a sheet of paper 41 is drawn from the roll 22 and this sheet of paper 41 is pressed against the bottom edges of the core that has been coated with adhesive at the third adhesive applying device 39 that is located just forwardly of the core forming device 36.

Forwardly of the adhesive applying device 39 is a second presser mechanism 42 contacting the bottom of the board 38 so that the traveling board is pressed between the mechanisms 37 and 42 to permit the adhesive to set. Located at the front end of the framework 20 is a capstan 43 for pulling the board 38 through the machine.

The drive mechanism for the apparatus includes an electric motor 44 at the front end of the machine and mounted on the bottom of the framework 20, a first gear box 45 rearwardly thereof rotating a drive shaft 46, a second gear box 47 located beneath the core forming device 36 and a second shaft 48 extending rearwardly from the second gear box 47.

Figure 5:
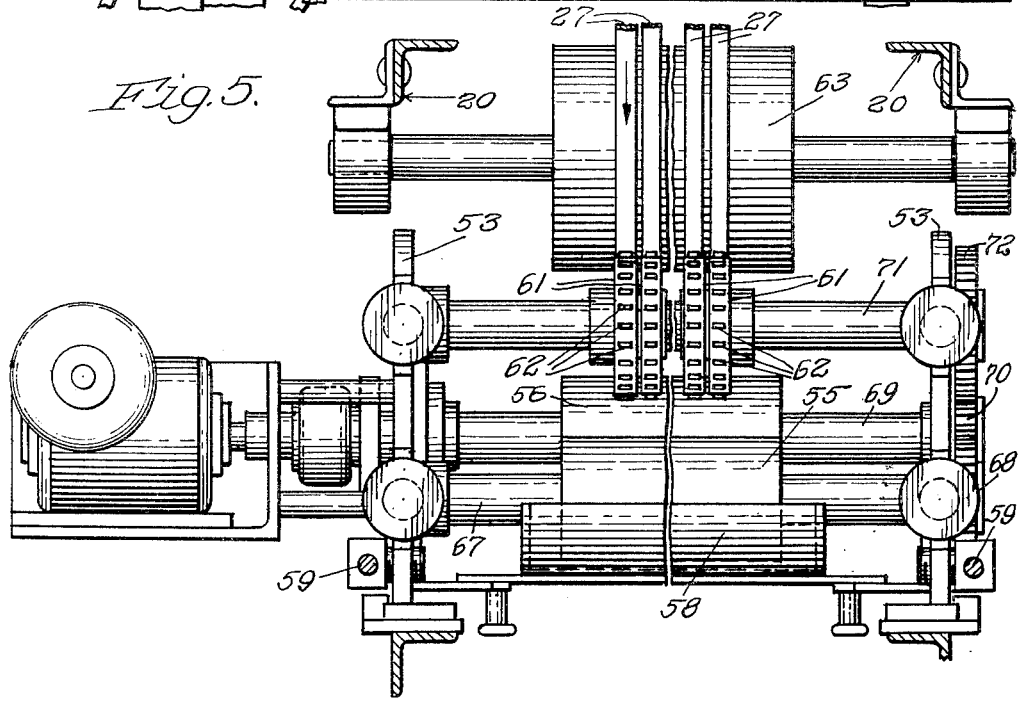
FIGURE 5 is a foreshortened elevational view taken substantially along line 5—5 of FIGURE 4.

As can be seen in FIGURES 2a and 3, the strips 27 of paper are drawn from the roll 26 and pass over a guide 49 and roll 50 with all the strips of paper being coplanar. Lever 52a which is locked in position by latch 52 regulates the position of device 49–51 for removing the curl from the paper from roll 26. From the roll 50 the strips 27 still in coplanar relationship pass through the first adhesive applying device 30, as is shown in detail in FIGURES 4 and 5.

The first adhesive applying device 30 comprises a pair of side plates 53 mounted on an intermediate portion 54 of the framework 25 with two rollers 55 and 56 being mounted horizontally between these side plates 53. One roller 55 of this pair of rollers is at a lower elevation than the other and has its bottom submerged in a bath of adhesive 57 in an adhesive pan 58. A bolt 59 connects the frame of unit 30 and an eccentric 59a on a shaft 59b. This serves to adjust the contact of glue applicators 62 to the strips 27.

The rollers 55 and 56 are adjacent each other so that adhesive picked up by the roler 55 is transferred to the roller 56. Roller 56 is adjacent a third roller 60 made up of a series of disks 61 on the periphery of which are located a plurality of raised spurs 62. These spurs 62 pick up adhesive from the surface of the roller 56 and transfer this adhesive in spots to the plurality of coplanar strips 27 of paper as they pass in contact with a guide roller 63. This guide roller 63 is mounted on side brackets 64 suspended from the top of the auxiliary framework 25. These brackets 64 are located above the side plates 53. Both rollers 55 and 56 are adjustable on adjusting bolts 65 and 66, respectively, that are mounted on the framework that includes the side plates 53.

The roller 55 is mounted on a shaft 67 provided on an outer end beyond a side plate 53 with a gear 68. The roller 56 is mounted on a similar shaft 69 which is also provided with a gear 70 meshing with the gear 68. The disks 61 are mounted on a shaft 71 which is also provided with a gear 72 meshing with the gear 70. The gears 68, 70 and 72 are driven from a sprocket 73 which drives the gear 74 that meshes with the gear 70 on the shaft 69. The sprocket 73 is driven by a chain 75 that passes over an idler sprocket 76 and is driven by a sprocket 77 on the end of the rearwardly extending drive shaft 48.

Forwardly of the roller 63 and on the principal framework 20 are two sets of pins 78 and 79 with the pins in each set being aligned as shown in FIGURE 2a. The pins 78 are aligned at a very small angle to the path of travel of the paper strips 27 while the pins 79 are aligned substantially parallel to the path of travel of the strips 27 prior to the time these strips reach the pins 78. The pins 79 extend transversely of the framework 20. With this arrangement the strips 27 of paper sliding first against the pins 78 and then against the pins 79 are turned at approximately 90° in their path of travel and are turned to a vertical position instead of the horizontal position that they are in when they leave the roller 63.

From the set of pins 79 the vertically arranged but horizontally aligned strips 27 of paper pass to the core former 36. The second adhesive applying device 32 applies adhesive to the core edges. This device also includes a pair of side plates mounted on tops 81 of a pair of bottom brackets 82.

Extending between the side plates 80 are parallel transverse shafts 86, 87, 88 and 89. Located on these shafts inwardly of one side plate 80 are gears 90, 91, 92 and 93, respectively, with the gears meshing to form a gear train for rotating these shafts. Mounted on the shaft 86 is a roller 94 closely spaced from a second roller 95 on the shaft 87 which in turn is adjacent a roller 96 on the shaft 88 which itself is adjacent the outer circumferences of a pair of disks 97 on a shaft 89, each adjacent an edge of paper 33. The roller 94 has its bottom immersed in a bath of adhesive 98 in an adhesive pan 99. The roller 95 is adjacent the outer surface of the roller 94 and is located above the pan 99. The roller 95 in turn is adjacent the surface of the roller 96 which is positioned laterally of and slightly below the pan 99. By this arrangement adhesive picked up by the roller 94 is transferred to the roller 96 and from there to the circumferences of the disks 97. The spacing between rollers 94 and 95 is by means of a pair of adjusting bolts 100. The roller 95 is similarly adjustable toward and away from the roller 96 by means of a pair of adjusting bolts 101. The disks on the shaft 89 are adjustable by means of a pair of bolts 102.

The forward edges of the mounting brackets 82 are provided with vertically spaced pairs of rollers 103 held in side brackets 104. These pairs of rollers 103 are arranged on opposite sides of a vertical plate 105 on opposite sides of the framework 20. These plates 105 are mounted on the superstructure 35 of the framework 20 on the rear side of this framework. Mounted on each bracket 82 (FIGURE 1a) is an eyebolt 106 to which is attached one end of a chain 107. Each chain passes upwardly from the eyebolt 106, around the top of a sprocket wheel 108 rotatably mounted at the top of the superstructure 35, then downwardly around a second sprocket 110 and then upwardly where it is attached to an eyebolt on bracket 82. Mounted immediately beneath each upper sprocket 108 is a plate 111, rotatably carrying a sprocket 112 engaging the chain 107. The sprockets 112 are rotated by means of a handle 113 to move the chain 107 longitudinally and thereby raise and lower the adhesive device 32. As mentioned earlier, the device 32 is guided in this vertical movement by the rollers 103 engaging opposite sides of the plate 105. The device 32 is locked in position by means of a clamp 114 adapted to clamp against opposite sides of one of the plates 105. In addition, the sprocket 112 that moves the chain 107 longitudinally may be locked against rotation by means of a dog 115.

A sheet of kraft paper 33 from the upper roll 34 is drawn across the counterweighted roller 116 where the paper is maintained taut by the counterweight 117 and this sheet 33 then is passed around a roller 118 mounted on a shaft 119 that extends between side plates 112 on the framework 20. The roller 118 presses this strip 33 of paper against the adhesive coated top edges 85 of the core.

Adhesive 98 is picked up from the pan 99 by the roller 94 and is transferred to the outer surface of the roller 95. This roller then transfers the adhesive to the outer surface of the roller 96 and from here a portion of the adhesive is transferred to the top of the core 38 by the roller 96 bearing against the core. Another portion of the adhesive may be transferred from the roller 96 to the circumference of the end disks 97. From the circumferences of these disks the adhesive is then transferred to the sheet of paper 33 adjacent the edges thereof.

The core making device 36 is shown most clearly in FIGURES 10–13 and 16–18. In these figures certain surrounding elements are omitted for clarity of illustration.

The core making device is mounted between two side plates 121 (FIGURE 1a) so that the whole unit may be installed in and removed from the apparatus without displacing the remainder of the apparatus. This is an important feature as it permits changing the core making device portion of the apparatus, as when it is desired to make different types of cores, without effecting the remainder of the appaartus. Furthermore, these changes in order to change the type of core made are easily and quickly accomplished.

The core making device is driven from a shaft 122 on the second gear box 47 with this shaft driving a chain 123 to rotate a shaft 124 on the core making device. The shaft 122 from the gear box 47 also drives a second chain 125 which in turn operates the second adhesive applying device 32 through a gear train including gears 125, 126 and 127. Gear 127 meshes with gear 92 which is illustrated most clearly in FIGURE 7.

Shaft 124 which extends between the side plates 121 carries a pair of sprockets 128 of large diameter which drive a pair of chains 129, at opposite sides of the core making device. These chains include attachment links 130 (FIGURE 17) with each link including on its outer side an outwardly extending flange 131. The pair of chains 129 pass around the side sprockets 128 and around a pair of second sprockets 132. The upper reaches of the chains 129 are adjacent the sides of the path of travel of paper strips used in making the core and these portions of the chains are carried on and guided by tracks 128 mounted on the frame 121. Cams 152 and 153 are supported by side plates 133 and 134 attached to the frame 121. The plates 133 are adjacent the rear sprockets 132 while the plates 134 are spaced from the forward sprockets 128. As can be seen in FIGURE 11, the uppermost reach of chains 129 turn downwardly away from the formed core as it passes the plates 134 on its travel to the sprocket 128. The rear sprockets 132 are mounted on an axle 135 which is adjustably held inside mounting brackets 136 that are attached to and form a part of the main side plates 121.

Mounted on opposite pairs of link flanges 131 are support members 137. These support members are of rectangular cross section and are attached to opposite flanges 131 as by bolts. Slidably mounted on top of each support member 137 is a pair of mounting members 138, 139. As is shown in FIGURE 17 the pair of mounting members have a combined width substantially the same as the width of the support member 137 on which they are mounted. These members 138 and 139 are slidable relative to each other and to the member 137 in directions longitudinal to the member 137 and transversely to the paths of travel of the chains 129. The mounting members 138 and 139 are retained against transverse movement by a pair of inverted U-shaped metal straps 140 each mounted on one end of the support member 137 and attached thereto and embracing the ends of the members 138 and 139 as illustrated in FIGURES 16 and 17. Each strap 140 has its sides lying in recesses 141 and 142 in the outer sides of members 138 and 139 respectively as shown in FIGURE 16. The ends of the members 138 and 139 extend beyond the chains 129. One end of each mounting member 138 carries a cam follower 143 in the form of a roller mounted on an upwardly extending spindle 144 while the opposite end of the other mounting member 139 of each pair carries a similar cam roller 145 similarly mounted.

Attached to the pairs of support members 137 and 138 inwardly of the chains 129 are a plurality of pairs of upwardly extending fingers 146 and 147. Each finger is in the form of a flat plate, as illustrated in FIGURES 16 and 18, having an essentially square upper end as shown at 148 and a narrower rectangular lower end as shown at 149. The fingers of each pair are identical but are mounted back-to-back in a mirror image relationship. The upper ends 148 and 150 of each pair of fingers extend in the direction of line of travel of the core maker and transversely to the mounting members 138 and 139. The lower end 149 of one finger 146 is held in one of the mounting members 139 while the lower end 151 of the other finger is held in the other mounting member 138 of each pair of mounting members. With this arrangement when the mounting member 138 as illustrated in FIGURE 16 is moved to the left and the mounting member 139 is moved to the right the fingers 146 and 147 move apart. When these mounting members are moved in the opposite direction they are again moved together.

In order to cause these movements of the mounting members of each pair the cam follower rollers 143 and 145 on opposite ends of the mounting members engage cam tracks 152 and 153. As is shown in FIGURES 10, 12 and 13 the cam track 152 is mounted on an overhanging bracket 133 while the opposite cam track is mounted on a similar bracket 134. The brackets 133 and 134 are mounted on the frame 156 of the apparatus.

The paper strips 27 mounted parallel to each other and on edge in the manner previously described and containing the spots of adhesive applied as previously described by the first adhesive applying device 30 are passed between the pairs of upstanding fingers 146 and 147 as shown in FIGURE 12. In the illustrated embodiment of the core forming device of FIGURE 12 the upstanding fingers 146 and 147 are arranged in parallel rows longitudinally of the direction of movement of the paper strips and in parallel rows transversely to this direction of movement. The pairs of fingers in adjacent rows are offset laterally from each other to provide a staggered relationship. Thus, as shown in FIGURE 12, the pairs of fingers in one lateral row are spaced midway between adjacent pairs of fingers in rows on either side thereof.

The spots of adhesive on the paper strips 27 are so positioned relative to the pairs of fingers 146—147 that when the fingers separate and press adjacent strips together the spots of adhesive will be located so as to adhere these pressed areas to each other. This pressing is accomplished by the movement of the cam followers 143 and 145 brought about by their engagement with the cams 152 and 153. Thus, as is illustrated in FIGURE 12, the core forming device moves in the direction indicated by the arrow 157. The cam track in the cams 152 and 153 converge so as to cause the separation of the pairs of fingers brought about by corresponding movement in the mounting members 138 and 139. As this converging continues the adjacent fingers of each pair of fingers 146—147 press toward each other with adjacent portions of strips 27 pressed into contact with each other. The tracks in the cams 142—143 then become parallel, as indicated at the upper portion of FIGURE 12, for the remainder of the travel of the mounting members to the forward guide plates 134 and this gives the adhesive time to set. The cams are then so shaped that the fingers are moved back to their initial positions, as shown at the lower portion of FIGURE 12, to release the adhered strips of paper. These adhered strips have thereupon formed a honeycomb shaped core 158, as illustrated in FIGURE 14.

As is illustrated in FIGURE 11, the previously described roller 118 has in the meantime pressed paper sheet 33 against the adhesive coated top edges of the core 158 which have been coated with adhesive in the manner previously described. Adhesive is applied to the edges of sheet 33 by end disks 97 only if these edges are to be folded over to form a closed edge board. Immediately the core with the top sheet 33 passes into the first section 159 of the top presser device 37. This section 159 contains a plurality of transverse rollers 160 which press the top sheet 33 of paper against the top edges of the core to make a smooth upper side of the assembly.

Beyond the forward end of the first section 159 of the presser mechanism there is positioned the third adhesive applying device 39 which is illustrated most clearly in FIGURES 8 and 9. This adhesive applying device is driven from the core making device axle 124 through a chain drive 161. The chain drive passes around the sprocket 162 driven by the axle 124 and passes around another sprocket 163 mounted on an axle 164 which is in turn mounted on the superstructure 35. The chain 161 engages a sprocket 165 mounted on a transverse shaft 166. The chain 161 also engages an idler sprocket 167 mounted on the framework of the apparatus.

The sprocket 165 driven by the chain 161 drives a larger gear 168 which in turn drives another gear 169.

This gear 169 drives a gear 170. The gears 168, 169 and 170 therefore constitute a gear train to operate the adhesive applying mechanism. The gear 170 rotates a roller 171 whose bottom surface is immersed in a bath 172 of adhesive in a pan 200. The outer surface of the roller 171 is closely adjacent an upper roller 173 mounted on a shaft 174 similar to the shaft 175 on which the roller 171 is mounted. The outer surface of the roller 173 transfers adhesive to the bottom edges of the core and is closely adjacent the outer surface of a pair of adhesive transfer disks 176 which contact the inner surface 40 of the bottom sheet of paper 41 adjacent the edges thereof only if the edges are to be folded over. This inner surface 40 is pressed into contact with the outer surfaces of disks 176 by means of a roller 177 mounted on a plate 178 attached to the framework 20 of the mechanism immediately beneath the path of travel of the paper strips 27.

From the adhesive applying device 39 the thusly produced board passes between the second section 179 of the upper presser mechanism and the lower presser mechanism 42. This second section contains a plurality of presser rollers 181 acting in conjunction with similar rollers 182 in the lower presser 42. These coacting rollers tend to hold the upper and lower sheets of paper against the core while the adhesive sets.

Beyond the presser mechanisms 37 and 42 there is located a capstan drive mechanism 43 for pulling the board and components thereof through the apparatus. The mechanism 43 contains a plurality of aligned upper rollers 185 and a plurality of similarly aligned and oppositely located lower rollers 186. The end lower roller 186 that is adjacent the presser mechanisms 37 and 42 is driven by a chain 188 which in turn is driven by a sprocket 189 that is mounted on an axle 190 on the first gear box 45. This chain 188 passes over an adjustably mounted idler sprocket 191.

As stated earlier, the electric motor 44 drives the drive shaft 46 through the gear box 45. The gears within the gear box 45 are driven by a pulley 192 mounted on the motor shaft 193 and which drives another pulley on shaft 195 by a V-belt 194.

As described earlier, the chain 161 at the third adhesive applying device 39 passes over an idler sprocket 163 that rotates freely on shaft 164. Sprocket 165 also rotates freely on its shaft 166 and is connected to gear 168 for rotation therewith. Shaft 166 has a pair of eccentrics (not shown) attached to it which operates in slots (not shown) on the adhesive applying device 39 at the end frames thereof. These eccentrics are so located that they lift the adhesive unit including the container 173 and adhesive rollers to contact the bottom of the core or drop it away from the core as desired when the shaft 166 and eccentrics are rotated. The shaft 166 is connected to shaft 164 by a pair of meshing gears (not shown) so that when shaft 164 is rotated shaft 166 and the two eccentrics mentioned above turn with it but in the opposite direction. An arm 195 (FIGURE 1a) is fixed to the end of shaft 164 as a means of rotating this shaft and thus raising and lowering the adhesive applying unit 39. A quadrant 197 mounted on framework 35 and a locking device 196a on arm 196 are provided to hold the adhesive applying unit or device 39 in any desired position. The frame of the device 39 is of course mounted so that this vertical movement can be accomplished so that it can still be held in a desired position. This is accomplished by providing vertically slotted mounting holes in the end frames of the device 39 as indicated at 200.

The operation and function of the various subassemblies of the apparatus are believed obvious from the above description of each of these subassemblies. In general, however, the operation of the device is as follows:

The paper strips 27 which are provided by any means desired, such as from a roll 26, are drawn in coplanar relationship past a first adhesive applying device 38 where spots of adhesive are applied on opposite sides of the strips and spaced so as to be correlated to the core forming device 36. After passing the adhesive applying device 30 the strips of paper are drawn past a turning station 31 where they are turned 90° so as to extend vertically with coplanar bottom edges 84 and coplanar top edges 85.

The vertically arranged horizontally aligned and parallel strips 27 are then drawn into the core making device 36 and then through a second adhesive applying device 32 which applies adhesive to the top edges 85 of the core. Paper 33 drawn from an upper roller 34 of paper is pressed against these top edges by the roller 118 and first section 159 of the upper presser mechanism 37.

From the core forming device 36 the assembly of core and top sheet 33 then passes over the third adhesive applying device 39 which applies adhesive to the bottom edges 84 of the core.

From this adhesive applying device 39 the board made up of the core and upper and lower sheets of paper then is drawn first between the second section 179 of the upper presser mechanism 37 and the lower presser mechanism 42 by the mechanism 43.

Although the paper strips 27 are shown withdrawn from a roll 26, it is obvious that a roll of paper could be provided and the strips cut therefrom. For simplicity the illustrated apparatus shows only a bottom and top strip of paper being applied to the core. It is of course obvious that by increasing the number of rolls of the paper and the number of adhesive applying devices additional sheets could be applied to the top and bottom and to the edges if desired. Furthermore, this same type of apparatus can be used for applying different types of base sheets such as decorative sheets or reinforcing sheets to provide any type of board desired.

Furthermore, although the illustrated apparatus shows applying adhesive to the sides of the paper strips 27 used in making the core, it is obvious that such an adhesive is not necessary as the fingers 146 and 147 are operable to hold the strips of paper in their proper form while the upper sheet and then the lower sheet are applied so that the sheets themselves hold the strips of the core in the desired assembled relationship.

From the above description it can be seen that the principal feature of the invention is to provide apparatus that forms a board in a continuous manner and in which an important part of the apparatus is the portion that forms the core. Another very important advantage is that the apparatus is so versatile that it can be quickly changed from making one type of core to making another type of core without excessive shutdown time. Furthermore, by repeating the proper sections of the apparatus as many top and bottom strips may be applied as required to make any type of board desired. It is also obvious that the apparatus can be run at relatively high speed so as to have a high production rate.

Any relatively fast setting liquid adhesive desired may be used with the apparatus of this invention. These adhesives and their characteristics are well known to those skilled in the art. Among the adhesives that have been found to be suitable are the polyvinyl acetate based adhesives which are tenacious and which set up in relatively short time.

Having described our invention as related to the embodiment set out herein, it is our intension that the invention be not limited by any of the details of description, unless otherwise specified, but rather be construed broadly within its spirit and scope as set out in the accompanying claims.

We claim:

1. Continuous board making apparatus, comprising: means for moving a plurality of strips of flexible material in edge-to-edge relationship past a first adhesive applying station; means for applying adhesive to the sides of said strips at spaced areas at said first station; means for moving said strips past a turning station; means at said turning station for turning said moving strips to arrange said strips in spaced side-by-side relationship with top and bottom edges; means for moving said strips past a second adhesive applying station; means at said station for applying adhesive to said top edges of the moving strips; means for pressing a moving first sheet of flexible material against said top edges of said moving strips; means for moving said strips and said first sheet past a third adhesive applying station; means at said third station for applying adhesive to said moving bottom edges; and means for pressing a moving second sheet of flexible material against said bottom edges of said moving strips.

2. Continuous board making apparatus, comprising: means for moving a plurality of strips of flexible material in edge-to-edge relationship and in a substantially common plane past a first adhesive applying station; means for applying adhesive to the sides of said strips at spaced areas at said first station; means for moving said strips past a turning station; means at said turning station for turning said moving strips approximately 90° to arrange said strips in spaced side-by-side relationship with top and bottom edges; means for moving said strips past a second adhesive applying station; means at said station for applying adhesive to said top edges of the moving strips; means for pressing a moving first sheet of flexible material against said top edges of said moving strips; means for moving said strips and said first sheet past a third adhesive applying station; means at said third station for applying adhesive to said moving bottom edges; and means for pressing a moving second sheet of flexible material against said bottom edges of said moving strips.

3. Continuous board making apparatus, comprising: means for moving a plurality of strips of flexible material in edge-to-edge relationship past a first adhesive applying station; means including a roller for applying adhesive at said first station to spaced areas of said moving strips; means including a plurality of spaced guide members arranged at an angle to the horizontal and contacting the uncoated side of said strips to turn said strips to spaced side-by-side relationship and arranged at said angle to present top and bottom edges; means for pressing said adhesive containing areas of said strips into contact with adjacent uncoated areas of adjacent strips in staggered relationship to provide a honeycomb type core; means for moving said strips past a second adhesive applying station; means at said station for applying adhesive to said top edges of the moving strips; means for pressing a moving first sheet of flexible material against said top edges of said moving strips; means for moving said strips and said first sheet past a third adhesive applying station; means at said third station for applying adhesive to said moving bottom edges; and means for pressing a moving second sheet of flexible material against said bottom edges of said moving strips.

4. Continuous board making apparatus, comprising: means for moving a plurality of strips of flexible material in edge-to-edge relationship past a first adhesive applying station; means including a roller for applying adhesive at said first station to spaced areas of said moving strips; means for arranging said strips of material in spaced side-by-side relationship having top and bottom edges; a plurality of pairs of adjacent upstanding fingers arranged in parallel rows extending both longitudinally and laterally of the directions of movement of said strips, the pairs of fingers in each lateral row being offset laterally from the pairs in adjacent lateral rows to provide a staggered relationship; means for directing each strip of material longitudinally between said staggered pairs of fingers; means moving each pair of fingers apart to press an adjacent pair of strips together at said spaced adhesive containing areas between a finger of one pair of fingers and the next laterally spaced finger of the laterally adjacent pair of fingers; means maintaining said pressed relationship to permit said adhesive to join said strips at said spaced adhesive containing areas to provide a honeycomb type core; means for moving said strips of said core past a second adhesive applying station; means at said station for applying adhesive to said top edges of the moving strips of said core; means for pressing a moving first sheet of flexible material against said top edges of said moving strips of said core; means for moving said strips of said core and said first sheet past a third adhesive applying station; means at said third station for applying adhesive to said moving bottom edges; and means for pressing a moving second sheet of flexible material against said bottom edges of said moving strips of said core.

5. Continuous board making apparatus, comprising: means for moving a plurality of strips of flexible material in edge-to-edge relationship past a first adhesive applying station; means including a roller for applying adhesive at said first station to spaced areas of said moving strips; means for arranging said strips of material in spaced side-by-side relationship having top and bottom edges; a plurality of pairs of adjacent upstanding fingers arranged in parallel rows extending both longitudinally and laterally of the direction of movement of said strips, the pairs of fingers in each lateral row being offset laterally from the pairs in adjacent lateral rows to provide a staggered relationship; a plurality of laterally extending adjacent mounting members, the mounting members being arranged in pairs with the corresponding fingers of each lateral row of pairs of fingers being mounted on a single one of said mounting members and the other fingers of said lateral row of pairs of fingers being mounted on the other mounting member of said pair; means for directing each strip of material longitudinally between said staggered pairs of fingers; means moving the mounting members of each pair transversely of said direction of movement of said strips in opposite directions to move each pair of fingers apart to press an adjacent pair of strips together at said spaced adheisve containing areas between a finger of one pair of fingers and the next laterally spaced finger of the laterally adjacent pair of fingers; means maintaining said pressed relationship to permit said adhesive to join said strips of said spaced adhesive containing areas to provide a honeycomb type core; means for moving said strips of said core past a second adhesive applying station; means at said station for applying adhesive to said top edges of the moving strips of said core; means for pressing a moving first sheet of flexible material against said top edges of said moving strips of said core; means for moving said strips of said core and said first sheet past a third adhesive applying station; means at said third station for applying adhesive to said moving bottom edges; and means for pressing a moving second sheet of flexible material against said bottom edges of said moving strips of said core.

6. Continuous board making apparatus, comprising: means for moving a plurality of strips of flexible material in edge-to-edge relationship past a first adhesive applying station; means including a roller for applying adhesive at said first station to spaced areas of said moving strips; means for arranging said strips of material in spaced side-by-side relationship having top and bottom edges; a plurality of pairs of adjacent upstanding fingers arranged in parallel rows extending both longitudinally and laterally of the direction of movement of said strips, the pairs of fingers in each lateral row being offset laterally from the pairs in adjacent lateral rows to provide a staggered relationship; a plurality of laterally extending adjacent mounting members, the mounting members being arranged in pairs with the corresponding fingers of each lateral row of pairs of fingers being mounted on a single one of said mounting members and the other fingers of said lateral row of pairs of fingers being mounted on the other mounting member of said pair;

means for directing each strip of material longitudinally between said staggered pairs of fingers; means moving said mounting members in said direction of movement of said strips at the speed of said strips and thereby providing a support for said strips; means moving the mounting members of each pair transversely of said direction of movement of said strips in opposite directions to move each pair of fingers apart to press an adjacent pair of strips together at said spaced adhesive containing areas between a finger of one pair of fingers and the next laterally spaced finger of the laterally adjacent pair of fingers, said moving means including a cam follower on each mounting member of each pair of mounting members and a cam for the cam follower of each corresponding mounting member of the pairs of mounting members; means maintaining said pressed relationship to permit said adhesive to join said strips at said spaced adhesive containing areas to provide a honeycomb type core; means for moving said strips of said core past a second adhesive applying station; means at said station for applying adhesive to said top edges of the moving strips of said core; means for pressing a moving first sheet of flexible material against said top edges of said moving strips of said core; means for moving said strips of said core and said first sheet past a third adhesive applying station; means at said third station for applying adhesive to said moving bottom edges; and means for pressing a moving second sheet of flexible material against said bottom edges of said moving strips of said core.

7. Continuous board making apparatus, comprising: means for moving a plurality of strips of flexible material in edge-to-edge relationship past a first adhesive applying station; means including a roller for applying adhesive at said first station to spaced areas of said moving strips; means for arranging said strips of material in paced side-by-side relationship having top and bottom edges; a plurality of pairs of adjacent upstanding fingers arranged in parallel rows extending both longitudinally and laterally of the direction of movement of said strips, the pairs of fingers in each lateral row being offset laterally from the pairs in adjacent lateral rows to provide a staggered relationship; a plurality of laterally extending adjacent mounting members, the mounting members being arranged in pairs with the corresponding fingers of each lateral row of pairs of fingers being mounted on a single one of said mounting members and the other fingers of said lateral rows of pairs of fingers being mounted on the other mounting member of said pair; means for directing each strip of material longitudinally between said staggered pairs of fingers; a pair of endless flexible members on which said mounting members are supported; means for driving said flexible members in said direction of movement of said strips at the speed of said strips; a cam follower on each mounting member of each pair of mounting members; a pair of cam track members each engaged by the cam followers of corresponding mounting members of the pairs of mounting members for moving each pair of mounting members transversely of said direction of movement to move each pair of fingers apart to press an adjacent pair of strips together at said spaced adhesive containing areas between a finger of one pair of fingers and the next laterally spaced finger of the laterally adjacent pair of fingers, said cam followers and cam track members maintaining said pressed relationship to permit said adhesive to join said strips at said spaced adhesive containing areas to provide a honeycomb type core; means for moving said strips of said core past a second adhesive applying station; means at said station for applying adhesive to said top edges of the moving strips of said core; means for pressing a moving first sheet of flexible material against said top edges of said moving strips of said core; means for moving said strips of said core and said first sheet past a third adhesive applying station; means at said third station for applying adhesive to said moving bottom edges; and means for pressing a moving second sheet of flexible material against said bottom edges of said moving strips of said core.

8. Continuous board making apparatus, comprising: means for moving a plurality of strips of flexible material in edge-to-edge relationship past a first adhesive applying station; means including a roller for applying adhesive at said first station to spaced areas of said moving strips; means for arranging said strips of material in spaced side-by-side relationship having top and bottom edges; a plurality of pairs of adjacent upstanding fingers arranged in parallel rows extending both longitudinally and laterally of the direction of movement of said strips, the pairs of fingers in each lateral row being offset laterally from the pairs in adjacent lateral rows to provide a staggered relationship; a plurality of laterally extending adjacent mounting members, the mounting members being arranged in pairs with the corresponding fingers of each lateral row of pairs of fingers being mounted on a single one of said mounting members and the other fingers of said lateral rows of pairs of fingers being mounted on the other mounting member of said pair; means for directing each strip of material longitudinally between said staggered pairs of fingers; a pair of spaced endless chains comprising links and having a horizontal reach; means for driving said chains in said direction of movement of said strips at the speed of said strips; a support member between each pair of laterally aligned links of said chains; a pair of mounting members on each support member with the corresponding fingers of lateral rows of pairs of fingers being mounted on a single one of said mounting members and the other fingers of said lateral rows of pairs of fingers being mounted on the other mounting member of said pair; a cam follower on each mounting member of each pair of mounting members; a pair of cam track members each engaged by the cam followers of corresponding mounting members of the pairs of mounting members for moving each pair of mounting members transversely of said direction of movement to move each pair of fingers apart to press an adjacent pair of strips together at said spaced adhesive containing areas between a finger of one pair of fingers and the next laterally spaced finger of the laterally adjacent pair of fingers, said cam followers and cam track members maintaining said pressed relationship to permit said adhesive to join said strips at said spaced adhesive containing areas to provide a honeycomb type core; means for moving said strips of said core past a second adhesive applying station; means at said station for applying adhesive to said top edges of the moving strips of said core; means for pressing a moving first sheet of flexible material against said top edges of said moving strips of said core; means for moving said strips of said core and said first sheet past a third adhesive applying station; means at said third station for applying adhesive to said moving bottom edges; and means for pressing a moving second sheet of flexible material against said bottom edges of said moving strips of said core.

9. A core forming device particularly for a continuous board making apparatus, comprising: means for moving a plurality of laterally vertical strips of flexible material forwardly in side-by-side relationship, the strips having top and bottom edges and adhesive at spaced areas on the sides of said strips; a plurality of pairs of adjacent upstanding fingers arranged in parallel rows extending both longitudinally and laterally of the direction of movement of said strips, the pairs of fingers in each lateral row being offset laterally from the pairs in adjacent lateral rows to provide a staggered relationship; means for directing each strip of material longitudinally between said staggered pairs of fingers; means moving each pair of fingers apart to press an adjacent pair of strips together at said spaced adhesive containing areas between a finger of one pair of fingers and the next laterally spaced finger of the laterally adjacent pair of fingers; and means maintaining said pressed relationship to permit said adhesive to join said strips at said spaced adhesive containing areas to provide a honeycomb type core.

10. A core forming device particularly for a continuous board making apparatus, comprising, means for moving a plurality of laterally vertical strips of flexible material forwardly in side-by-side relationship, the strips having top and bottom edges and adhesive at spaced areas on the sides of said strips; a plurality of pairs of adjacent upstanding fingers arranged in parallel rows extending both longitudinally and laterally of the direction of movement of said strips, the pairs of fingers in each lateral row being offset laterally from the pairs in adjacent lateral rows to provide a staggered relationship; a plurality of laterally extending adjacent mounting members, the mounting members being arranged in pairs with the corresponding fingers of each lateral row of pairs of fingers being mounted on a single one of said mounting members and the other fingers of said lateral row of pairs of fingers being mounted on the other mounting member of said pair; means for directing each strip of material longitudinally between said staggered pairs of fingers; means moving the mounting members of each pair transversely of said direction of movement of said strips in opposite directions to move each pair of fingers apart to press an adjacent pair of strips together at said spaced adhesive containing areas between a finger of one pair of fingers and the next laterally spaced finger of the laterally adjacent pair of fingers; and means maintaining said pressed relationship to permit said adhesive to join said strips at said spaced adhesive containing areas to provide a honeycomb type core.

11. A core forming device particularly for a continuous board making apparatus, comprising: means for moving a plurality of laterally vertical strips of flexible material forwardly in side-by-side relationship, the strips having top and bottom edges and adhesive at spaced areas on the sides of said strips; a plurality of pairs of adjacent upstanding fingers arranged in parallel rows extending both longitudinally and laterally of the direction of movement of said strips, the pairs of fingers in each lateral row being offset laterally from the pairs in adjacent lateral rows to provide a staggered relationship; a plurality of laterally extending adjacent mounting members, the mounting members being arranged in pairs with the corresponding fingers of each lateral row of pairs of fingers being mounted on a single one of said mounting members and the other fingers of said lateral row of pairs of fingers being mounted on the other mounting member of said pair; means for directing each strip of material longitudinally between said staggered pairs of fingers; means moving said mounting members in said direction of movement of said strips at the speed of said strips and thereby providing a support for said strips; means moving the mounting members of each pair transversely of said direction of movement of said strips in opposite directions to move each pair of fingers apart to press an adjacent pair of strips together at said spaced adhesive containing areas between a finger of one pair of fingers and the next laterally spaced finger of the laterally adjacent pair of fingers, said moving means including a cam follower on each mounting member of each pair of mounting members and a cam for the cam follower of each corresponding mounting member of the pairs of mounting members; and means maintaining said pressed relationship to permit said adhesive to join said strips at said spaced adhesive containing areas to provide a honeycomb type core.

12. A core forming device particularly for a continuous board making apparatus, comprising: means for moving a plurality of laterally vertical strips of flexible material forwardly in side-by-side relationship, the strips having top and bottom edges and adhesive at spaced areas on the sides of said strips; a plurality of pairs of adjacent upstanding fingers arranged in parallel rows extending both longitudinally and laterally of the direction of movement of said strips, the pairs of fingers in each lateral row being offset laterally from the pairs in adjacent lateral rows to provide a staggered relationship; a plurality of laterally extending adjacent mounting members, the mounting members being arranged in pairs with the corresponding fingers of each lateral row of pairs of fingers being mounted on a single one of said mounting members and the other fingers of said lateral row of pairs of fingers being mounted on the other mounting member of said pair; means for directing each strip of material longitudinally between said staggered pairs of fingers; a pair of endless flexible members on which said mounting members are supported; means for driving said flexible members in said direction of movement of said strips at the speed of said strips; a cam follower on each mounting member of each pair of mounting members; and a pair of cam track members each engaged by the cam followers of corresponding mounting members of the pairs of mounting members for moving each pair of mounting members transversely of said direction of movement to move each pair of fingers apart to press an adjacent pair of strips together at said spaced adhesive containing areas between a finger of one pair of fingers and the next laterally spaced finger of the laterally adjacent pair of fingers, said cam followers and cam track members maintaining said pressed relationship to permit said adhesive to join said strips at said spaced adhesive containing areas to provide a honeycomb type core.

13. A core forming device particularly for a continuous board making apparatus, comprising: means for moving a plurality of laterally vertical strips of flexible material forwardly in side-by-side relationship, the strips having top and bottom edges and adhesive at spaced areas on the sides of said strips; a plurality of pairs of adjacent upstanding fingers arranged in parallel rows extending both longitudinally and laterally of the direction of movement of said strips, the pairs of fingers in each lateral row being offset laterally from the pairs in adjacent lateral rows to provide a staggered relationship; a plurality of laterally extending adjacent mounting members, the mounting members being arranged in pairs with the corresponding fingers of each lateral row of pairs of fingers being mounted on a single one of said mounting members and the other fingers of said lateral row of pairs of fingers being mounted on the other mounting member of said pair; means for directing each strip of material longitudinally between said staggered pairs of fingers; a pair of spaced endless chains comprising links and having a horizontal reach; means for driving said chains in said direction of movement of said strips at the speed of said strips; a support member between each pair of laterally aligned links of said chains; a pair of mounting members on each support member with the corresponding fingers of lateral rows of pairs of fingers being mounted on a single one of said mounting members and the other fingers of said lateral rows of pairs of fingers being mounted on the other mounting member of said pair; a cam follower on each mounting member of each pair of mounting members; and a pair of cam track members each engaged by the cam followers of corresponding mounting members of the pairs of mounting members for moving each pair of mounting members transversely of said direction of movement to move each pair of fingers apart to press an adjacent pair of strips together at said spaced adhesive containing areas between a finger of one pair of fingers and the next laterally spaced finger of the laterally adjacent pair of fingers, said cam followers and cam track members maintaining said pressed relationship to permit said adhesive to join said strips at said spaced adhesive containing areas to provide a honeycomb type core.

14. Continuous board making apparatus, comprising: means for providing a plurality of strips of flexible material in spaced side-by-side relationship; means for moving said strips through a path; means for arranging and retaining said strips in a predetermined pattern during said moving to form a core structure having top and bottom edge portion; means operable subsequent to said arranging and during said moving for attaching a moving first sheet of flexible material to one of said top and bottom edge portions; and means for then releasing said retaining means from said moving core structure.

15. Continuous board making apparatus, comprising: means for providing a plurality of strips of flexible material in spaced side-by-side relationship; means for moving said strips through a path; means for arranging and retaining said strips in a predetermined pattern during said moving; means operable over a time interval for fixing said strips in said pattern said moving to form a core having top and bottom edge portions; means operable subsequent to said arranging and during said moving for attaching a moving first sheet of flexible material to one of said top and bottom edge portions; and means for then releasing said retaining means from said moving core structure subsequent to said time interval.

16. Continuous board making apparatus, comprising: means for providing a plurality of strips of flexible material in spaced side-by-side relationship; means for moving said strips through a path; means for arranging and retaining said strips in a predetermined pattern during said moving to form a core structure having top and bottom edge portions; means operable subsequent to said arranging and during said moving for attaching a moving first sheet of flexible material to one of said top and bottom edge portions; means for then releasing said retaining means from said moving core structure; and means for then attaching a moving second sheet of flexible material during said moving to the other of said top and bottom edge portions.

17. Continuous board making apparatus, comprising: means for providing a plurality of strips of flexible material in spaced side-by-side relationship; means for moving said strips through a path; means for applying activatable fastening means to said strips; means for arranging and retaining said strips in a predetermined pattern during said moving; means operable over a time interval for fixing said strips in said pattern during said moving to form a core having top and bottom edge portions, said fastening means being activated during said interval to fix said strips in said core pattern; means operable subsequent to said arranging and during said moving for attaching a moving first sheet of flexible material to one of said top and bottom edge portions; and means for then releasing said retaining means from said moving core structure.

18. Continuous board making apparatus, comprising: means for providing a plurality of strips of flexible material in spaced side-by-side relationship; means for moving said strips through a path; means for applying adhesive to the sides of said strips; means for drawing said sides into contact with each other at spaced staggered areas to join said sides at said areas to form an expanded honeycomb type core structure; and means operable during said moving for applying a moving sheet of flexible material to one of said top and bottom edge portions.

19. Continuous board making apparatus, comprising: means for providing a plurality of strips of flexible material in spaced side-by-side relationship; means for moving said strips through a path; means for applying adhesive to the sides of said strips; means for drawing said sides into contact with each other at spaced staggered areas to join said sides at said areas to form an expanded honeycomb type core structure; means operable during said moving for applying a moving sheet of flexible material to one of said top and bottom edge portions; and means operable during said moving for applying a moving sheet of flexible material to the other of said top and bottom edge portions.

References Cited in the file of this patent

UNITED STATES PATENTS

| | | |
|---|---|---|
| 2,606,133 | Havens | Aug. 5, 1952 |
| 2,610,934 | Steele | Sept. 16, 1952 |
| 2,769,481 | Meanor et al. | Nov. 6, 1956 |
| 2,771,935 | Clemens | Nov. 27, 1956 |
| 2,790,207 | Steele et al. | Apr. 30, 1957 |